United States Patent
Fraser et al.

(10) Patent No.: US 6,945,775 B2
(45) Date of Patent: Sep. 20, 2005

(54) METHOD AND APPARATUS FOR HEATING A SLURRY TO A PREDETERMINED TEMPERATURE

(75) Inventors: Kevin S. Fraser, Mississauga (CA); Murray S. Pearson, Brampton (CA); Holger Krutzelmann, Mississauga (CA)

(73) Assignee: Hatch, Ltd.

( * ) Notice: Subject to any disclaimer, the term of this patent is extended or adjusted under 35 U.S.C. 154(b) by 0 days.

(21) Appl. No.: 10/481,862

(22) PCT Filed: Sep. 12, 2002

(86) PCT No.: PCT/CA02/01381
§ 371 (c)(1),
(2), (4) Date: Sep. 30, 2004

(87) PCT Pub. No.: WO2004/024962

PCT Pub. Date: Mar. 25, 2004

(65) Prior Publication Data
US 2005/0053889 A1  Mar. 10, 2005

(51) Int. Cl.[7] ............................................. F27B 15/00
(52) U.S. Cl. ........................ 432/95; 432/58; 266/197
(58) Field of Search .......................... 432/58, 14, 197, 432/95; 122/235.26; 266/197, 251; 110/245, 110/247, 347

(56) References Cited

U.S. PATENT DOCUMENTS

| 669,411 A | * | 3/1901 | Guiterman ................... 432/95 |
| 2,448,922 A | | 9/1948 | Simpson et al. |
| 2,503,202 A | | 4/1950 | Johnson et al. |
| 2,503,703 A | | 4/1950 | Bergstrom |
| 2,666,734 A | | 1/1954 | Findlay |
| 2,685,498 A | | 8/1954 | Dickinson |
| 2,755,232 A | | 7/1956 | Dougherty |
| 3,092,471 A | | 6/1963 | Stromeyer |
| 3,423,840 A | | 1/1969 | Beeken |
| 3,647,758 A | | 3/1972 | Ryffel et al. |
| 3,728,239 A | | 4/1973 | McDonald |
| 4,018,588 A | * | 4/1977 | Hardy, Jr. ..................... 65/19 |
| 4,157,245 A | * | 6/1979 | Mitchell et al. .......... 48/197 R |
| 4,374,092 A | | 2/1983 | Marquess et al. |
| 4,390,409 A | | 6/1983 | Audeh |
| 4,455,282 A | | 6/1984 | Marquess et al. |
| 4,526,731 A | | 7/1985 | Henderson |
| 4,539,917 A | | 9/1985 | Mallon et al. |
| 4,552,725 A | | 11/1985 | Audeh |

(Continued)

FOREIGN PATENT DOCUMENTS

NL  8003464  1/1982

(Continued)

OTHER PUBLICATIONS

Product Literature: "Valtek Survivor Control Valves," Flowserve Corporation (1999) pp. 1-4.

(Continued)

Primary Examiner—Gregory Wilson
(74) Attorney, Agent, or Firm—Kirkpatrick & Lockhart Nicholson Graham LLP

(57) ABSTRACT

The temperature of a metallurgical slurry in a heater vessel is accurately controlled by heating a first portion of the slurry in the heater vessel by contact with a heating medium such as steam, and by adding to the heater vessel controlled portions of a slurry at lower temperature. The lower temperature slurry may be added to the heater vessel in an intermittent or continuous manner, with addition of the lower temperature slurry being regulated by a valve, the operation of which is controlled by a control device which receives temperature information from one or more temperature sensors.

19 Claims, 1 Drawing Sheet

U.S. PATENT DOCUMENTS

| | | | |
|---|---|---|---|
| 4,568,258 A | | 2/1986 | Henderson |
| 4,909,731 A | * | 3/1990 | Zinn et al. ..................... 432/58 |
| 5,769,627 A | * | 6/1998 | Chisaki et al. ................ 432/95 |
| 5,820,814 A | * | 10/1998 | Doumet ....................... 266/44 |
| 6,110,255 A | | 8/2000 | Williams et al. |

FOREIGN PATENT DOCUMENTS

| RU | 2027502 C1 | 1/1995 |
|---|---|---|
| SU | 1736930 A1 | 5/1992 |

OTHER PUBLICATIONS

Product Literature: "Valtek International 36: Installation, Operation, Maintenance Instructions: Survivor Control Valves," Valtek Incorporated (1995) pp. 1-6.

International Search Report for PCT/CA02/01381.

* cited by examiner

METHOD AND APPARATUS FOR HEATING A SLURRY TO A PREDETERMINED TEMPERATURE

CROSS-REFERENCE TO RELATED APPLICATION

This application claims the benefit of International Application No. PCT/CA2002/001381, which has the international filing date of Sep. 12, 2002 and which was published under PCT Article 21(2) in English.

FIELD OF THE INVENTION

This invention relates to the heating of slurries in metallurgical processes.

BACKGROUND OF THE INVENTION

A number of metallurgical processes involve the treatment of aqueous slurries containing solid, metal-containing particles. In one such metallurgical process, an aqueous slurry of a mineral or metal-containing compound is subjected to leaching or oxidation at elevated temperatures and pressures in an autoclave. In order to maximize the efficiency of the leaching or oxidation process, it is preferred to preheat the slurry before feeding it into the autoclave. For this purpose, a heater vessel is provided upstream of the autoclave. The slurry is heated by contact with a heating medium inside the heater vessel. The heating medium typically comprises steam generated by an autoclave flashing process.

It is preferred that the temperature of the slurry be heated to within a narrow temperature range inside the heater vessel. The temperature of the discharge slurry is typically maintained by controlling the flash steam pressure in the apparatus (by venting). However, precise control of the slurry temperature is difficult to achieve in this manner as there are a number of other process variables such as autoclave throughput, heating medium composition, feed slurry specific heat capacity and boiling point elevation, which affect the quantity and quality of heating medium condensed by the process, and control of the vent gas flow is not always practical.

Accordingly, there is a need for improved apparatus and methods for heating slurries in a heater vessel.

SUMMARY OF THE INVENTION

The present invention overcomes the disadvantages of the prior art by providing an apparatus and method for heating a slurry to a predetermined temperature. According to the invention, a first portion of the slurry is heated in the heater vessel as in the prior art by contact with the heating medium. The heated slurry is combined with controlled portions of slurry at a lower temperature to accurately maintain the temperature of the heated slurry within the accepted range. The inventors have found that the method and apparatus for heating slurry according to the invention allows more accurate control of the temperature of the slurry heated within the heater vessel.

In one aspect, the present invention provides an apparatus for heating a slurry to a predetermined temperature, comprising: (a) a heater vessel having a slurry heating section and a slurry collection section downstream of the slurry heating section, wherein slurry heated in the heating section is collected in the collection section; (b) a heating medium inlet through which a heating medium for heating the slurry enters the heater vessel; (c) a first slurry inlet through which a first portion of the slurry enters the vessel and contacts the heating medium in the heating section; (d) a second slurry inlet through which a second portion of the slurry enters the vessel, the second slurry inlet being located relative to the heating section such that a temperature of the second portion of the slurry entering the collection section is lower than a temperature of the first portion of the slurry entering the collection section; (e) a slurry outlet adjacent the collection section; (f) temperature sensing means for sensing the temperature of the slurry in the collection section; and (g) a valve for controlling flow of the second portion of the slurry into the vessel through the second slurry inlet so as to control the temperature of the slurry in the collection section.

In another aspect, the present invention provides a method for heating a slurry to a predetermined temperature in a heater vessel having a slurry heating section and a slurry collection section downstream of the slurry heating section, the method comprising: (a) feeding a heating medium into the heater vessel such that the heating medium passes through the heating section; (b) feeding a first portion of the slurry into the heater vessel such that the first portion of the slurry passes through the heating section and is heated by the heating medium; (c) controllably feeding a second portion of the slurry into the heater vessel such that it bypasses at least a portion of the heating section; (d) collecting the first and second portions of the slurry in the collection section, wherein a temperature of the second portion of the slurry as it enters the collection section is lower than a temperature of the first portion of the slurry as it enters the collection section; and (e) monitoring a temperature of the slurry collected in the collection section; wherein the feeding of the second portion of the slurry into the heater vessel is controlled such that when the temperature of the slurry collected in the collection section exceeds the predetermined temperature, the second portion of the slurry is added into the heater vessel to lower the temperature of the slurry in the collection section, and when the temperature of the slurry in the collection section is less than the predetermined temperature, addition of the second portion of the slurry to the heater vessel is diminished or discontinued.

BRIEF DESCRIPTION OF THE DRAWINGS

The invention will now be described, by way of example only, with reference to the accompanying drawing, in which.

DETAILED DESCRIPTION OF PREFERRED EMBODIMENTS

Figure 1:
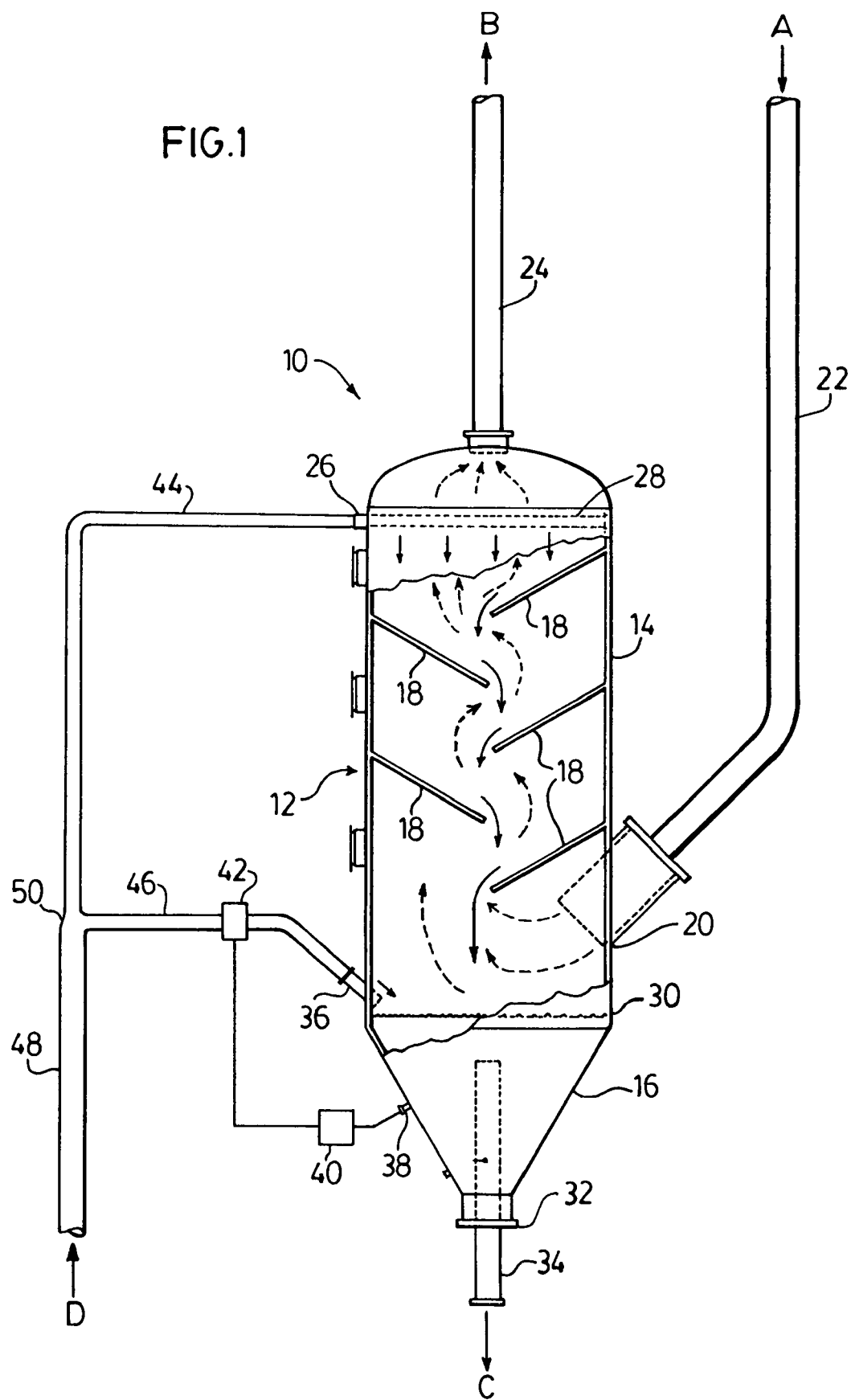
FIG. 1 is a schematic view of a preferred apparatus according to the present invention.

A preferred method and apparatus according to the present invention will now be described with reference to FIG. 1.

In the preferred apparatus 10 illustrated in FIG. 1, a heater vessel 12 is provided for heating a slurry. The heater vessel 12 comprises a slurry heating section 14 and a slurry collection section 16 which is located downstream of the heating section 14. In the specific embodiment shown in FIG. 1, the heating section 14 and collection section 16 are arranged vertically relative to one another with the heating section 14 being located in an upper portion of heater vessel 12 and the collection section 16 being located in a lower portion of heater vessel 12.

The slurry heating section 14 preferably comprises a plurality of baffles 18 projecting inwardly from the walls of heater vessel 12, and angled downwardly toward the collection section 16. A heating medium for heating the slurry enters the heater vessel 12 through a heating medium inlet 20. The heating medium is preferably a gas, most preferably steam which is generated by an autoclave flashing process. The steam flows in the direction of arrow A through a pipe 22 which carries the heating medium to the inlet 20. As shown in the drawing, the heating medium is fed into the heater vessel 12 downstream of heating section 14, preferably being located below the lowermost baffle 18. The gaseous heating medium then flows upwardly through the heating vessel 12, around baffles 18, and exits the vessel 12 in the direction of arrow B through a vent pipe 24.

A first portion of the slurry enters the heater vessel 12 through a first slurry inlet 26. The first portion of the slurry is then pumped through a perforated pipe 28 within the heater vessel 12, and is sprayed from the perforations in the pipe into the interior of the heater vessel 12. The first portion of the slurry then passes downwardly by gravity through the heating section 14 of vessel 12, passing down across the surfaces of the baffles 18 in the direction of the solid arrows shown inside the vessel 12. As the first portion of the slurry passes downwardly through heater section 14, it is brought into contact with the heating medium rising upwardly through the vessel 12, thereby increasing the temperature of the slurry.

The first portion of the slurry, heated as described above, is collected in collection section 16. The approximate level of the collected slurry inside section 16 is designated as numeral 30.

A slurry outlet 32 is provided adjacent the slurry collection section 16, and is preferably provided at the lower end thereof. From the outlet 32, the heated slurry is pumped in the direction of arrow C through a pipe 34, which may for example lead to an autoclave in which the slurry is subjected to high pressure, high temperature leaching.

The apparatus 10 further comprises a second slurry inlet 36 through which a second portion of the slurry enters the vessel 12. The second slurry inlet is located relative to heating section 14 such that a temperature of the second portion of the slurry entering the collection section 16 is lower than a temperature at which the first portion of the slurry enters the collection section 16. In other words, the second slurry inlet 36 is located such that the second portion of the slurry bypasses at least a portion of the heating section, thereby ensuring that the second portion of the slurry will be at a lower temperature than the first portion of the slurry when it enters the collection section 16. Most preferably, as shown in FIG. 1, the second slurry inlet 36 is located downstream of the heating section 14, below the lowermost baffle 18, such that the second portion of the slurry flows directly into the collection section 16 without passing through the heating section 14.

Thus, the first and second portions of the slurry are combined in the collection section 16, with the relatively unheated second portion of the slurry cooling the heated first portion of the slurry.

In order to ensure that the temperature of the slurry in the collection section is accurately controlled, the flow of the second portion of the slurry through inlet 36 must be controlled. Accordingly, the apparatus 10 also includes at least one temperature sensor 38 for monitoring the temperature of the slurry in the collection section 16. Temperature data collected by the at least one temperature sensor 38 is communicated to a control device 40, which controls operation of a regulating valve 42, which regulates flow of the second portion of the slurry through inlet 36. This permits the pumping of the second portion of the slurry into heater vessel 12 to be controlled such that when the temperature of the slurry collected in the collection section 16 exceeds a predetermined temperature, the second portion of the slurry is added into heater vessel 12 to lower the temperature of the slurry in the collection section 16. Conversely, when the temperature of the slurry in the collection section is less than the predetermined temperature, addition of the second portion of the slurry to the heater vessel 12 is diminished or discontinued.

The valve 42 is preferably of a type which is designed for handling abrasive slurries, and which is capable of adjusting the flow of slurry to the heater vessel 12. That is, the flow of slurry through the valve is preferably controllable between a zero flow rate and a maximum flow rate, thereby providing precise control over the temperature of the slurry within heater vessel 12. In fact, it may be preferred to maintain a continuous, variable flow of slurry through valve 42. One preferred type of valve is the Valtek® Survivor™ control valve. Such valves have a sweep angle design to provide high flow capacity while minimizing impingement of particles on the valve body; ceramic trim to protect the valve from erosion; wiper rings to provide longer packing life; a clamped seat design to minimize erosion, simplify maintenance and provide high flow capacity; and an extended-venturi seat design to protect the valve body from erosive damage.

In a preferred embodiment of the invention, the apparatus 10 is operated continuously, with the first portion of the slurry 26 being pumped continuously into heater vessel 12 through inlet 26, the heating medium being continuously fed into heater vessel 12 through inlet 20, and the heated slurry collected in collection section 16 being continuously pumped from the heater vessel 12 through outlet 32. The second portion of the slurry is added to the heater vessel intermittently in order to control the temperature of the slurry in collection section 16. As shown in FIG. 1, the first and second portions of the slurry are delivered to the respective inlets 26 and 36 through pipes 44 and 46, with the valve controlling flow of the slurry preferably being located in pipe 46 through which the second portion of the slurry is pumped.

Preferably, the first and second portions of the slurry originate from the same source, with the combined slurry preferably being pumped in the direction of arrow D through a pipe 48 having a branch at 50 which divides the flow of slurry into pipes 44 and 46.

Although the present invention has been described with reference to a preferred embodiment, it will be appreciated that the present invention is not limited thereto. Rather, the invention includes all embodiments which may fall within the scope of the following claims.

What is claimed is:

1. An apparatus for heating a slurry to a predetermined temperature, comprising:
   (a) a heater vessel having a slurry heating section and a slurry collection section downstream of the slurry heating section, wherein slurry heated in the heating section is collected in the collection section;
   (b) a heating medium inlet through which a heating medium for heating the slurry enters the heater vessel;
   (c) a first slurry inlet through which a first portion of the slurry enters the vessel and contacts the heating medium in the heating section;

(d) a second slurry inlet through which a second portion of the slurry enters the vessel, the second slurry inlet being located relative to the heating section such that a temperature of the second portion of the slurry entering the collection section is lower than a temperature of the first portion of the slurry entering the collection section;

(e) a slurry outlet adjacent the collection section;

(f) temperature sensing means for sensing the temperature of the slurry in the collection section;

(g) a valve for controlling flow of the second portion of the slurry into the vessel through the second slurry inlet so as to control the temperature of the slurry in the collection section.

2. The apparatus according to claim 1, wherein the second slurry inlet is located such that the second portion of the slurry bypasses at least a portion of the heating section.

3. The apparatus according to claim 1, wherein the second slurry inlet is located downstream of the heating section such that the second portion of the slurry flows directly into the collection section without passing through the heating section.

4. The apparatus according to claim 1, wherein the slurry heating section is located in an upper portion of the heater vessel and the collection section is located in a lower portion of the heater vessel.

5. The apparatus according to claim 4, wherein the first slurry inlet is located above the slurry heating section, and the heating medium inlet is located below the slurry heating section, and wherein the heating medium is a gas which passes upward through the heating vessel in countercurrent flow relative to the first portion of the slurry.

6. The apparatus according to claim 4, wherein the slurry heating section comprises a plurality of baffles over which the first portion of the slurry flows.

7. The apparatus according to claim 1, further comprising a first conduit through which the first portion of the slurry is delivered to the heater vessel, and a second conduit through which the second portion of the slurry is delivered to the heater vessel, the valve controlling flow of the slurry through the second conduit.

8. The apparatus according to claim 7, wherein both the first conduit and second conduit receive slurry from a third conduit.

9. The apparatus according to claim 1, wherein the valve adjustably controls the flow of slurry to the heater vessel between a zero flow rate and a maximum flow rate.

10. A method for heating a slurry to a predetermined temperature in a heater vessel having a slurry heating section and a slurry collection section downstream of the slurry heating section, the method comprising:

(a) feeding a heating medium into the heater vessel such that the heating medium passes through the heating section;

(b) feeding a first portion of the slurry into the heater vessel such that the first portion of the slurry passes through the heating section and is heated by the heating medium;

(c) controllably feeding a second portion of the slurry into the heater vessel such that it bypasses at least a portion of the heating section;

(d) collecting the first and second portions of the slurry in the collection section, wherein a temperature of the second portion of the slurry as it enters the collection section is lower than a temperature of the first portion of the slurry as it enters the collection section; and (e) monitoring a temperature of the slurry collected in the collection section;

wherein the feeding of the second portion of the slurry into the heater vessel is controlled such that when the temperature of the slurry collected in the collection section exceeds the predetermined temperature, the second portion of the slurry is added into the heater vessel to lower the temperature of the slurry in the collection section, and when the temperature of the slurry in the collection section is less than the predetermined temperature, addition of the second portion of the slurry to the heater vessel is diminished or discontinued.

11. The method according to claim 10, wherein the heating medium is a gas.

12. The method according to claim 10, wherein the heating medium is steam.

13. The method according to claim 10, wherein the heating medium is fed into the heater vessel downstream of the heating section and passes upwardly through the heating section.

14. The method according to claim 10, wherein the first portion of the slurry enters the heater vessel in an upper portion thereof, and flows downward through the heating section by gravity.

15. The method according to claim 10, wherein the second portion of the slurry bypasses the heating section and flows directly into the collection section.

16. The method according to claim 10, wherein the first portion of the slurry and the heating medium are continuously fed into the heater vessel.

17. The method according to claim 10, wherein the temperature of the slurry collected in the collection section is monitored continuously.

18. The method according to claim 10, wherein the slurry collected in the collection section is continuously withdrawn through an outlet located at a bottom of the collection section.

19. The method according to claim 10, wherein the second portion of the slurry is continuously fed into the heater vessel.

* * * * *